United States Patent
Castellanos Zamora et al.

(10) Patent No.: US 11,864,098 B2
(45) Date of Patent: Jan. 2, 2024

(54) METHODS AND APPARATUSES FOR NETWORK FUNCTION SELECTION IN 5G FOR A USER

(71) Applicant: Telefonaktiebolaget LM Ericsson (publ), Stockholm (SE)

(72) Inventors: David Castellanos Zamora, Madrid (ES); Jesus-Angel De-Gregorio-Rodriguez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 436 days.

(21) Appl. No.: 17/292,628

(22) PCT Filed: Jan. 25, 2019

(86) PCT No.: PCT/EP2019/051924
§ 371 (c)(1),
(2) Date: May 10, 2021

(87) PCT Pub. No.: WO2020/098974
PCT Pub. Date: May 22, 2020

(65) Prior Publication Data
US 2022/0039003 A1    Feb. 3, 2022

(30) Foreign Application Priority Data
Nov. 14, 2018 (EP) .................................. 18000897

(51) Int. Cl.
*H04W 48/18* (2009.01)
*H04W 8/20* (2009.01)
*H04W 12/06* (2021.01)

(52) U.S. Cl.
CPC ............. *H04W 48/18* (2013.01); *H04W 8/20* (2013.01); *H04W 12/06* (2013.01)

(58) Field of Classification Search
CPC ........ H04W 48/18; H04W 8/20; H04W 12/06
See application file for complete search history.

(56) References Cited

U.S. PATENT DOCUMENTS

| 2018/0199160 A1 | 7/2018 | Edge |
| 2019/0174449 A1* | 6/2019 | Shan ..................... H04W 60/04 |

FOREIGN PATENT DOCUMENTS

KR    20180106998 A    10/2018

OTHER PUBLICATIONS

International Search Report and Written Opinion dated Mar. 15, 2019 for International Application No. PCT/EP2019/051924 filed Jan. 25, 2019, consisting of 12-pages.

(Continued)

*Primary Examiner* — Afshawn M Towfighi
(74) *Attorney, Agent, or Firm* — Christopher & Weisberg, P.A.

(57) ABSTRACT

The present specification faces the issues of selecting a right 5G Network Function, NF, instance in scenarios wherein NF instances are considered NF segments that manage different sets of users and wherein NF segmentation is not based on SUPI ranges. To solve these issues, there is provided a new procedure for accessing an NF segment, wherein registration and discovery of the right NF segment is based on a Routing Indicator, and wherein the Routing Indicator, which is received with a Subscription Concealed Identifier (SUCI) identifying a UE, is included in any interaction between 5GC NFs.

20 Claims, 11 Drawing Sheets

(56) References Cited

OTHER PUBLICATIONS

3GPP TS 23.501 V15.3.0; 3rd Generation Partnership Project; Technical Specification Group Services and System Aspects; System Architecture for the 5G System; Stage 2 (Release 15); Sep. 2018, consisting of 226-pages.

3GPP TS 23.502 V15.3.0; 3rd Generation Partnership Project; Technical Specification Group Services and System Aspects; Procedures for the 5G System; Stage 2 (Release 15); Sep. 2018, consisting of 330-pages.

3GPP TS 29.501 V15.1.0; 3rd Generation Partnership Project; Technical Specification Group Core Network and Terminals; 5G System; Principles and Guidelines for Services Definition; Stage 3 (Release 15); Sep. 2018, consisting of 58-pages.

3GPP TS 29.503 V15.1.0; 3rd Generation Partnership Project; Technical Specification Group Core Network and Terminals; 5G System; Unified Data Management Services; Stage 3 (Release 15); Sep. 2018, consisting of 154-pages.

3GPP TS 29.509 V15.1.0; 3rd Generation Partnership Project; Technical Specification Group Core Network and Terminals; 5G System; Authentication Server Services; Stage 3 (Release 15); Sep. 2018, consisting of 38-pages.

3GPP TS 29.510 V15.1.0; 3rd Generation Partnership Project; Technical Specification Group Core Network and Terminals; 5G System; Network Function Repository; Stage 3 (Release 15); Sep. 2018, consisting of 84-pages.

3GPP TS 33.501 V15.1.0; 3rd Generation Partnership Project; Technical Specification Group Services and System Aspects; Security architecture and procedures for 5G system (Release 15); Jun. 2018, consisting of 152-pages.

3GPP TSG-SA WG2 Meeting #129Bis S2-1811925; Title: AUSF and UDM selection; Source to WG: Ericsson; Source to TSG: SA2; Work Item Code: 5Gs_Ph1; Date and Location: Nov. 26-30, 2018, West Palm Beach, FL, USA, consisting of 7-pages.

3GPP TSG-SA WG2 Meeting #129Bis S2-1811926; Title: AUSF and UDM selection in 5G NFs; Source to WG: Ericsson; Source to TSG: SA2; Work Item Code: 5Gs_Ph1; Date and Location: Nov. 26-30, 2018, West Palm Beach, FL, USA, consisting of 6-pages.

3GPP TSG-SA WG2 Meeting #129Bis S2-1813369; Title: AUSF and UDM selection; Source to WG: Ericsson, Nokia, Nokia Shanghai Bell, Huawei; Source to TSG: SA2; Work Item Code: 5Gs_Ph1; Date and Location: Nov. 26-30, 2018, West Palm Beach, FL, USA, consisting of 6-pages.

3GPP TSG-SA WG2 Meeting #129Bis S2-1813387; Title: AUSF and UDM selection in 5GC NFs; Source to WG: Ericsson, Huawei; Source to TSG: SA2; Work Item Code: 5Gs_Ph1; Date and Location: Nov. 26-30, 2018, West Palm Beach, FL, USA, consisting of 6-pages.

* cited by examiner

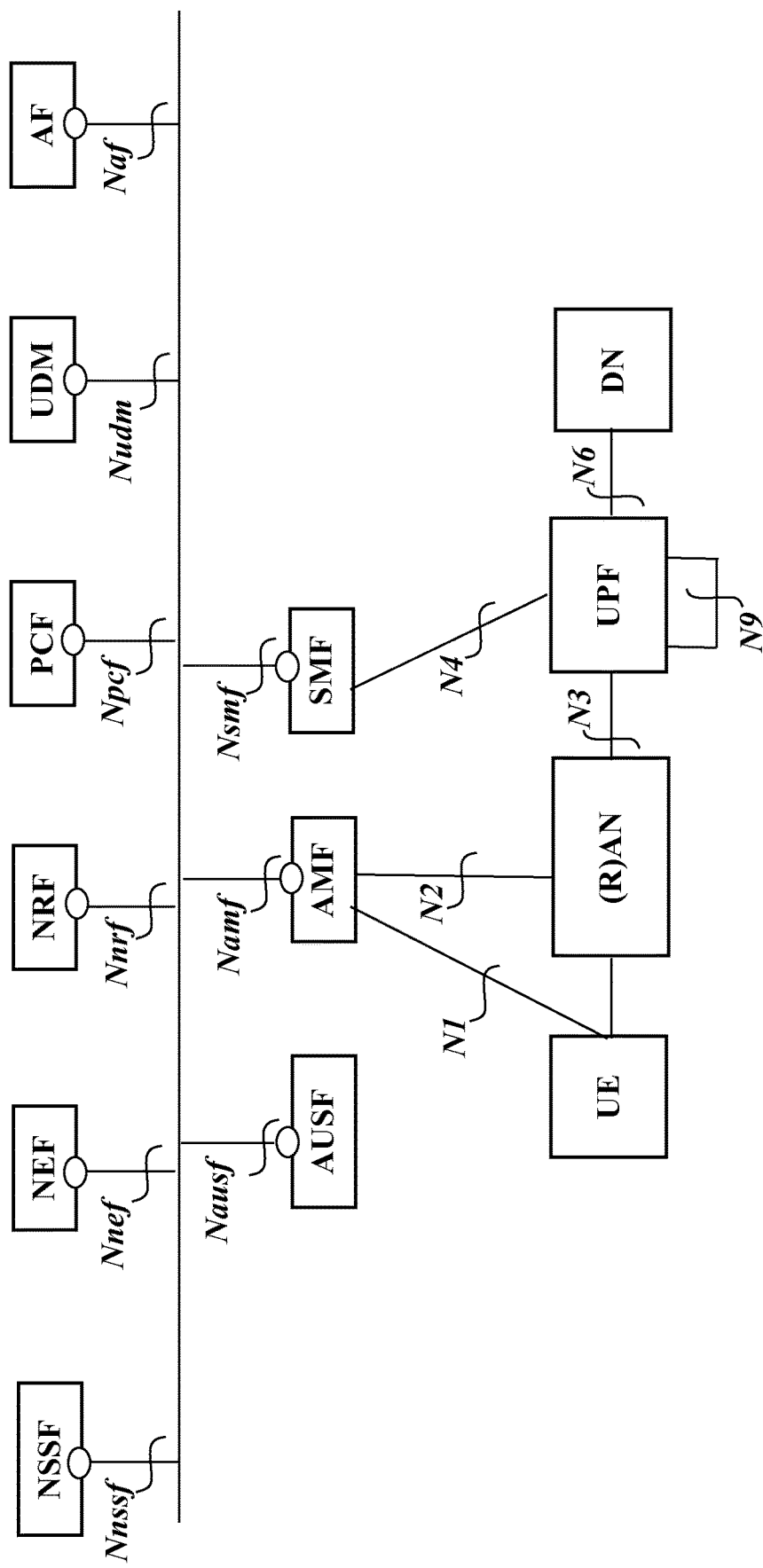
FIG. -1-

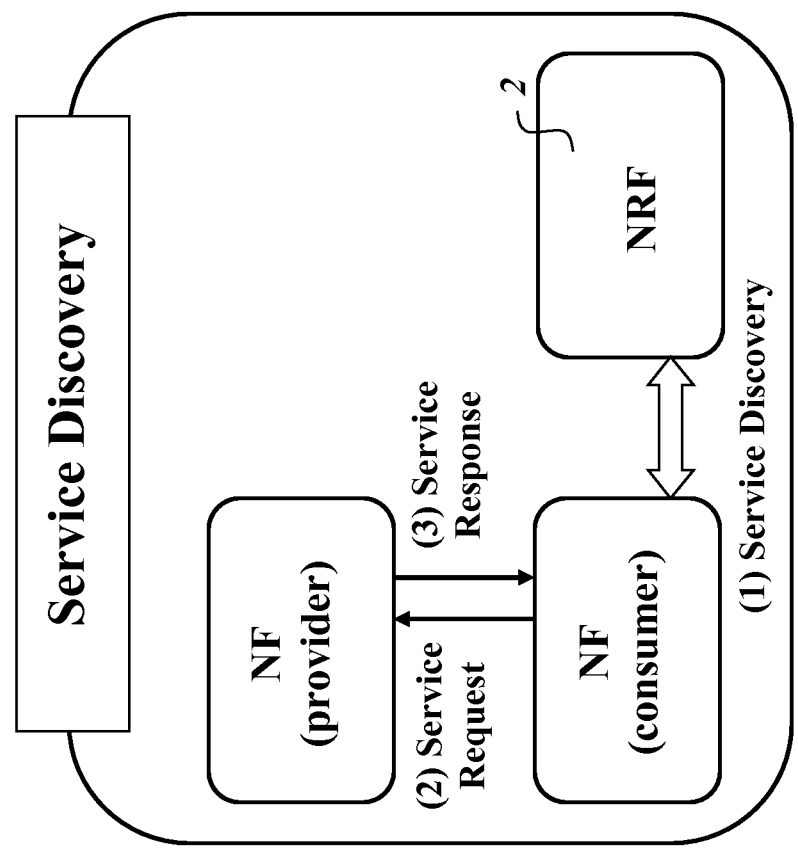
FIG. -3-
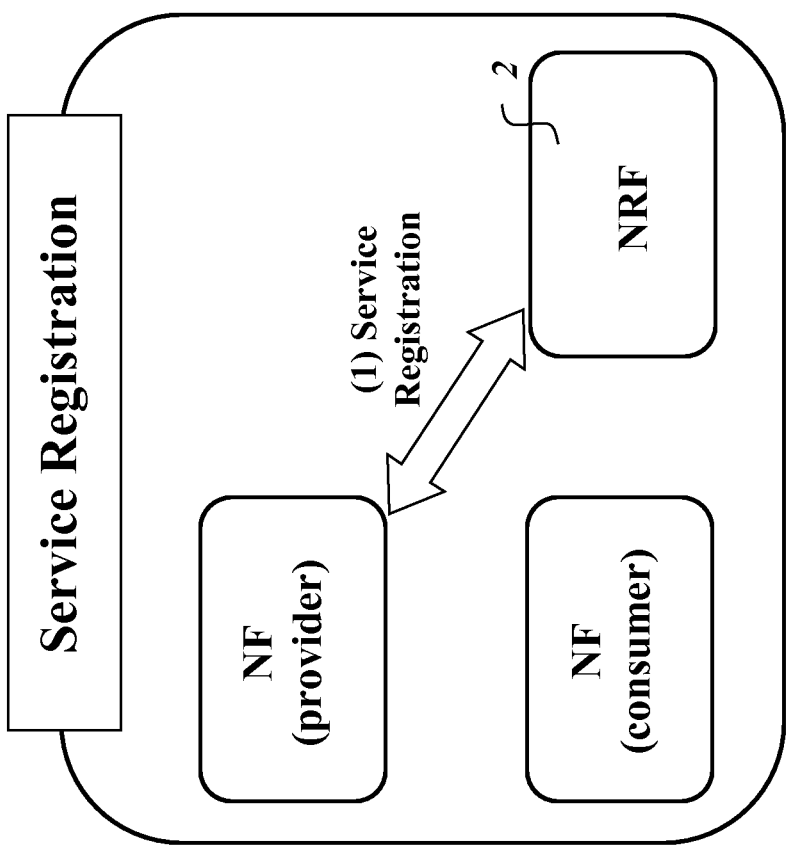
FIG. -2-

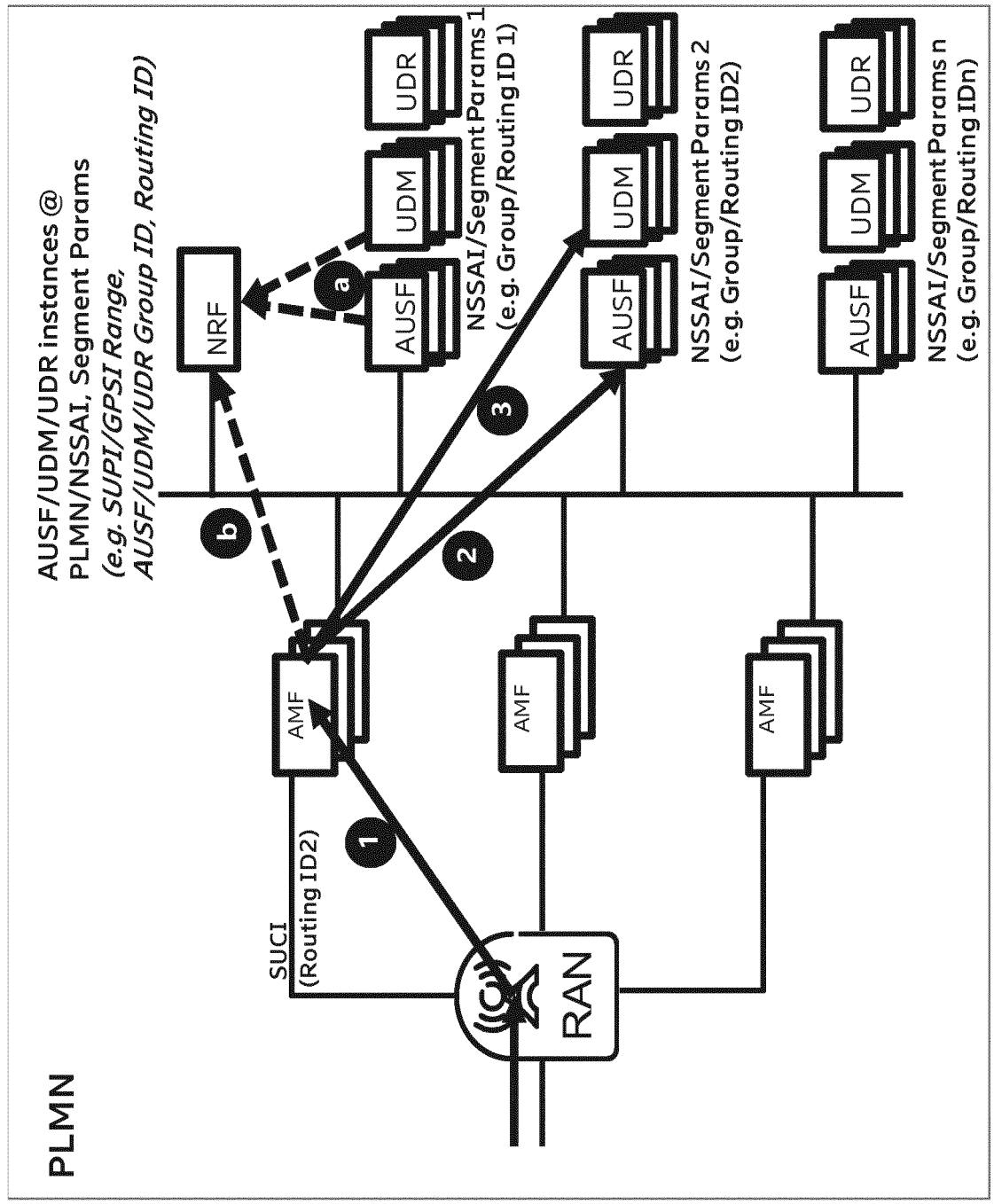
FIG. -4-

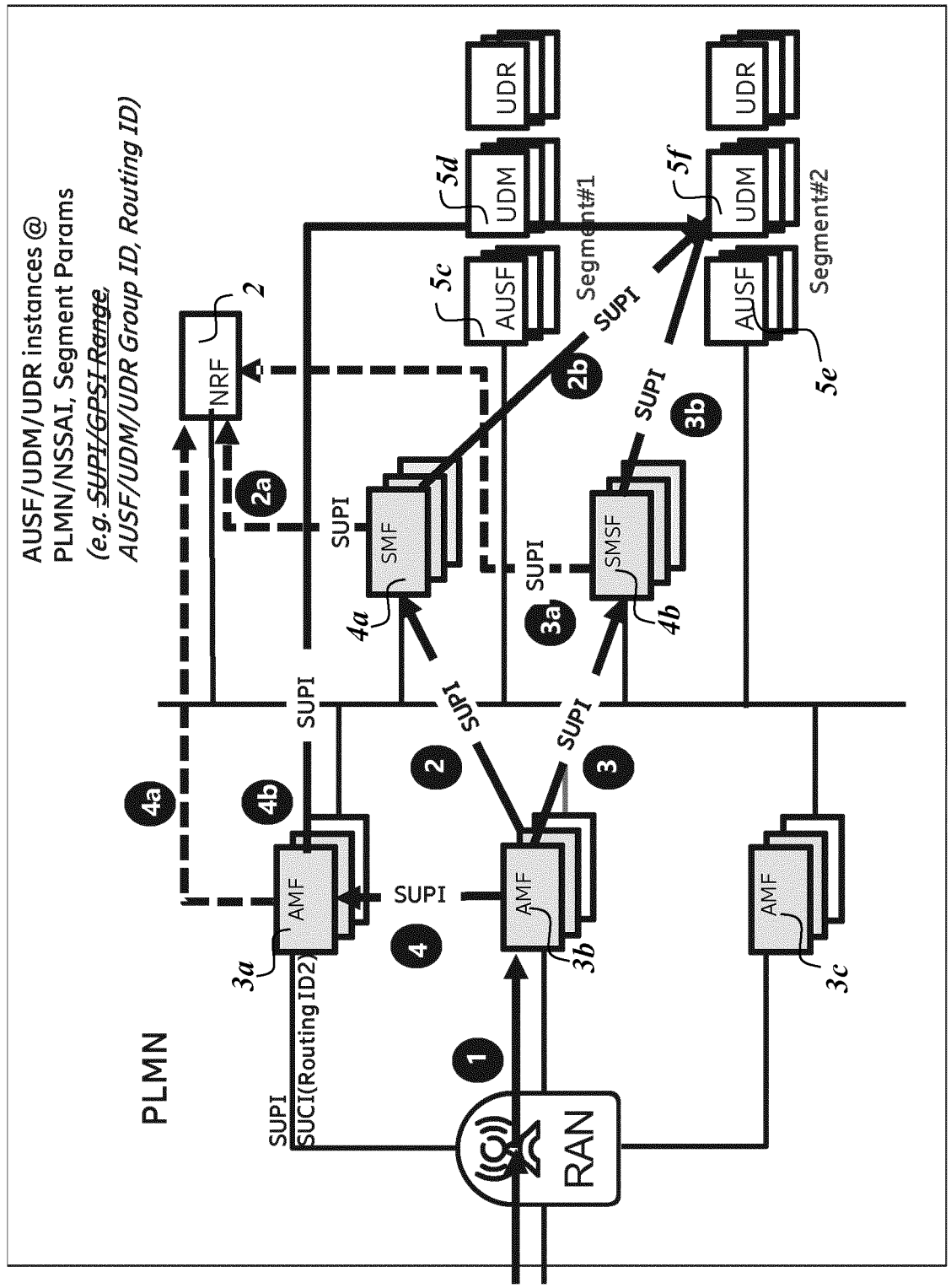
FIG. -5-

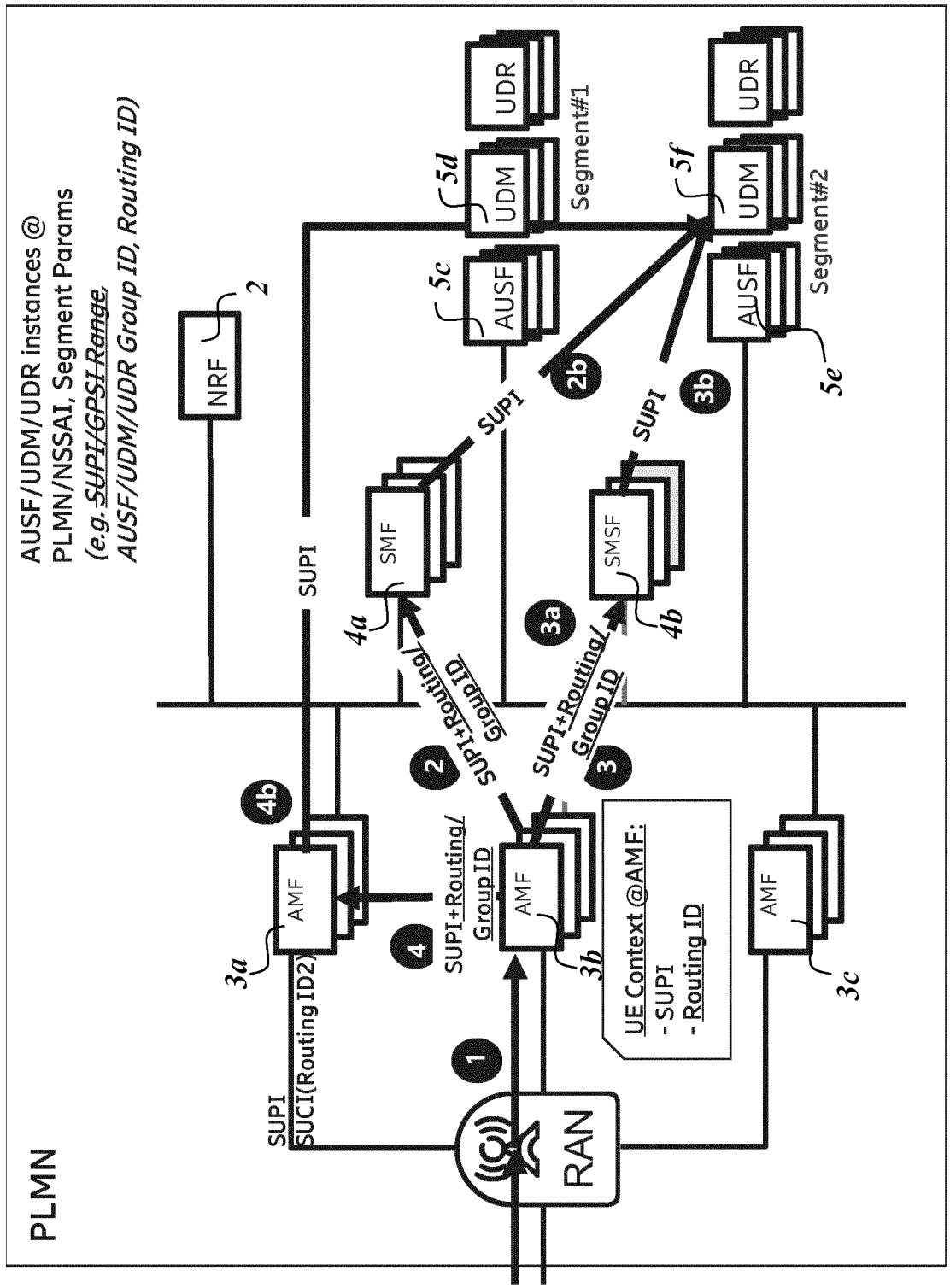
FIG. -6-

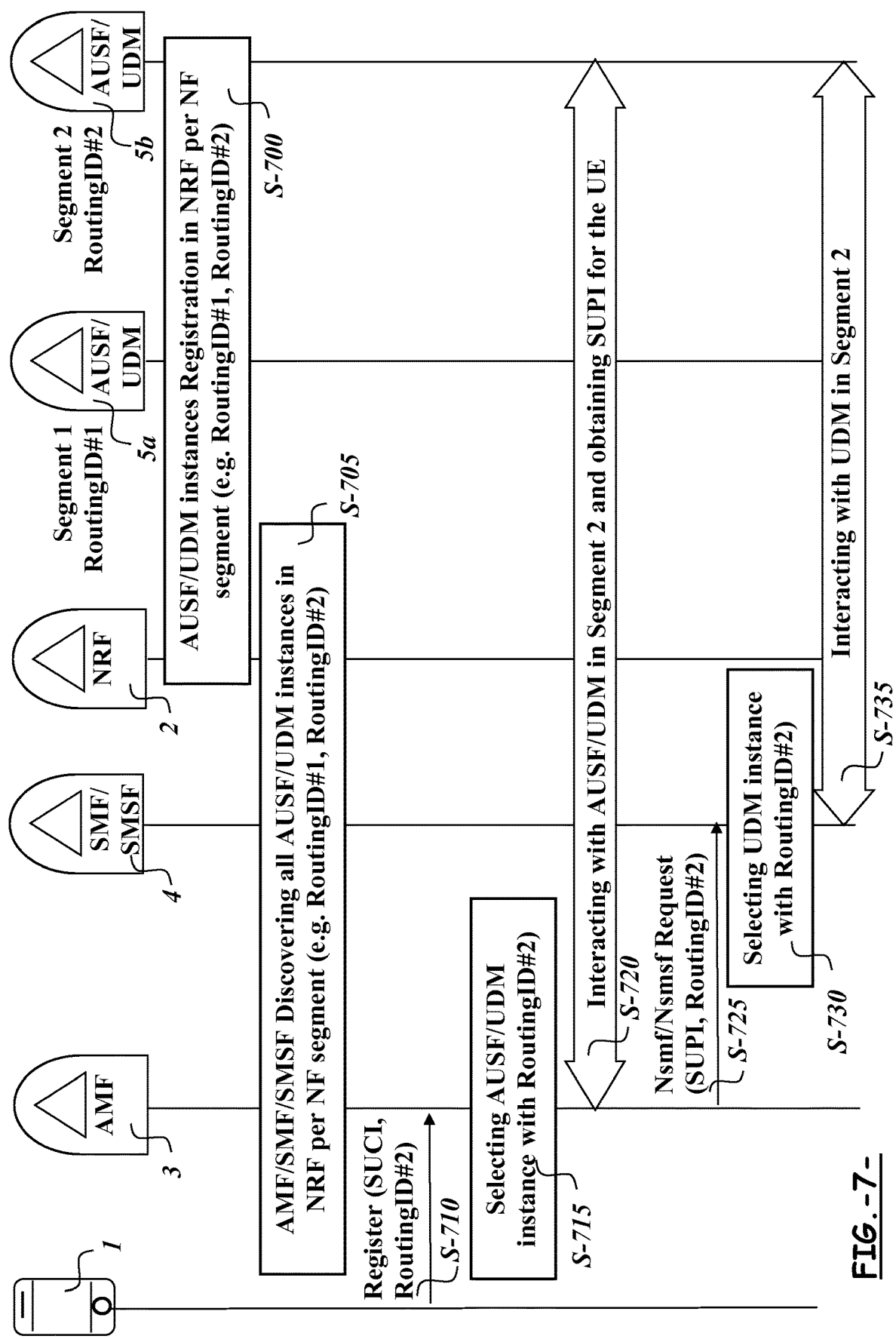
FIG.-7-

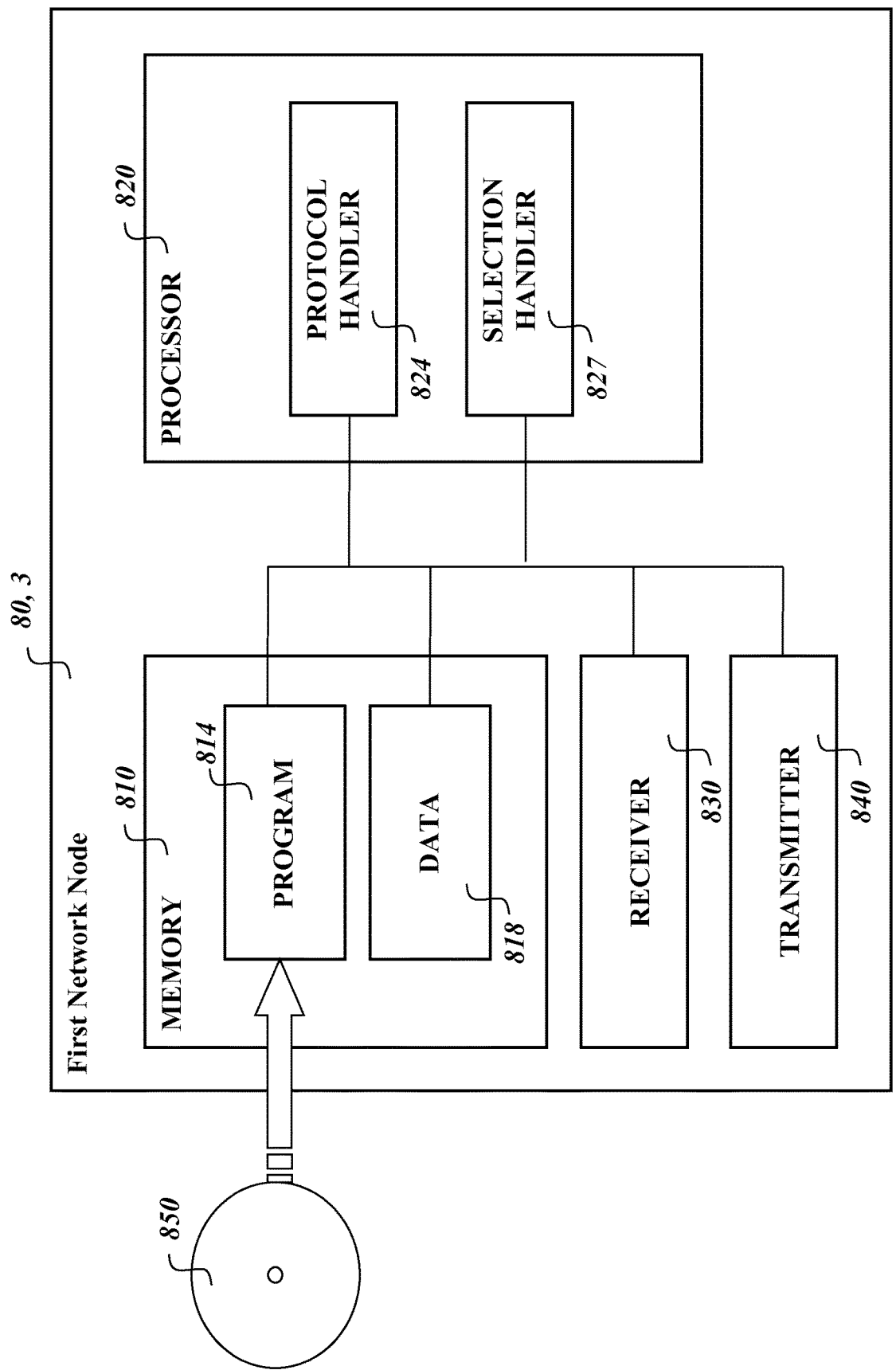
FIG. -8-

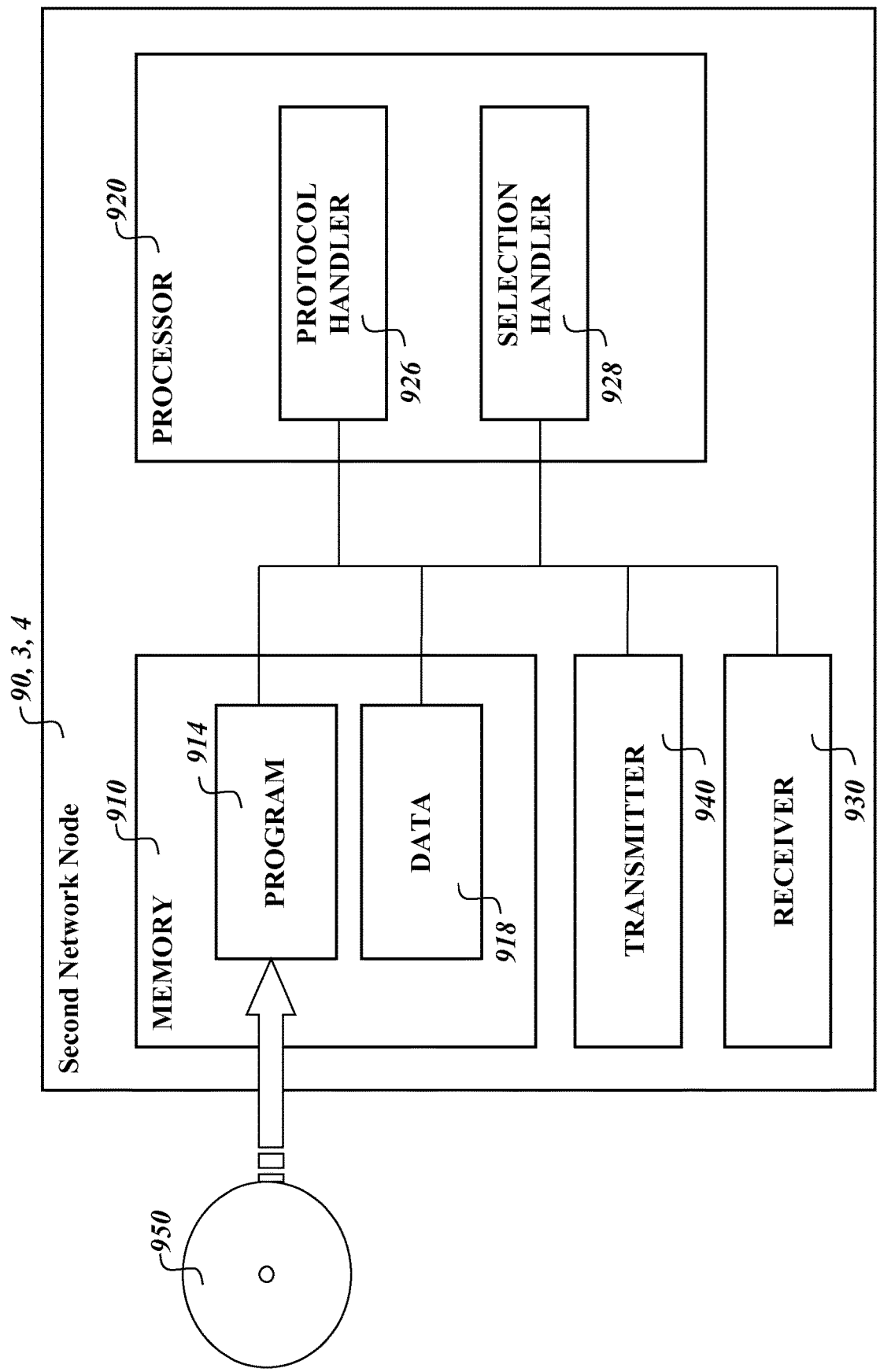
FIG.-9-

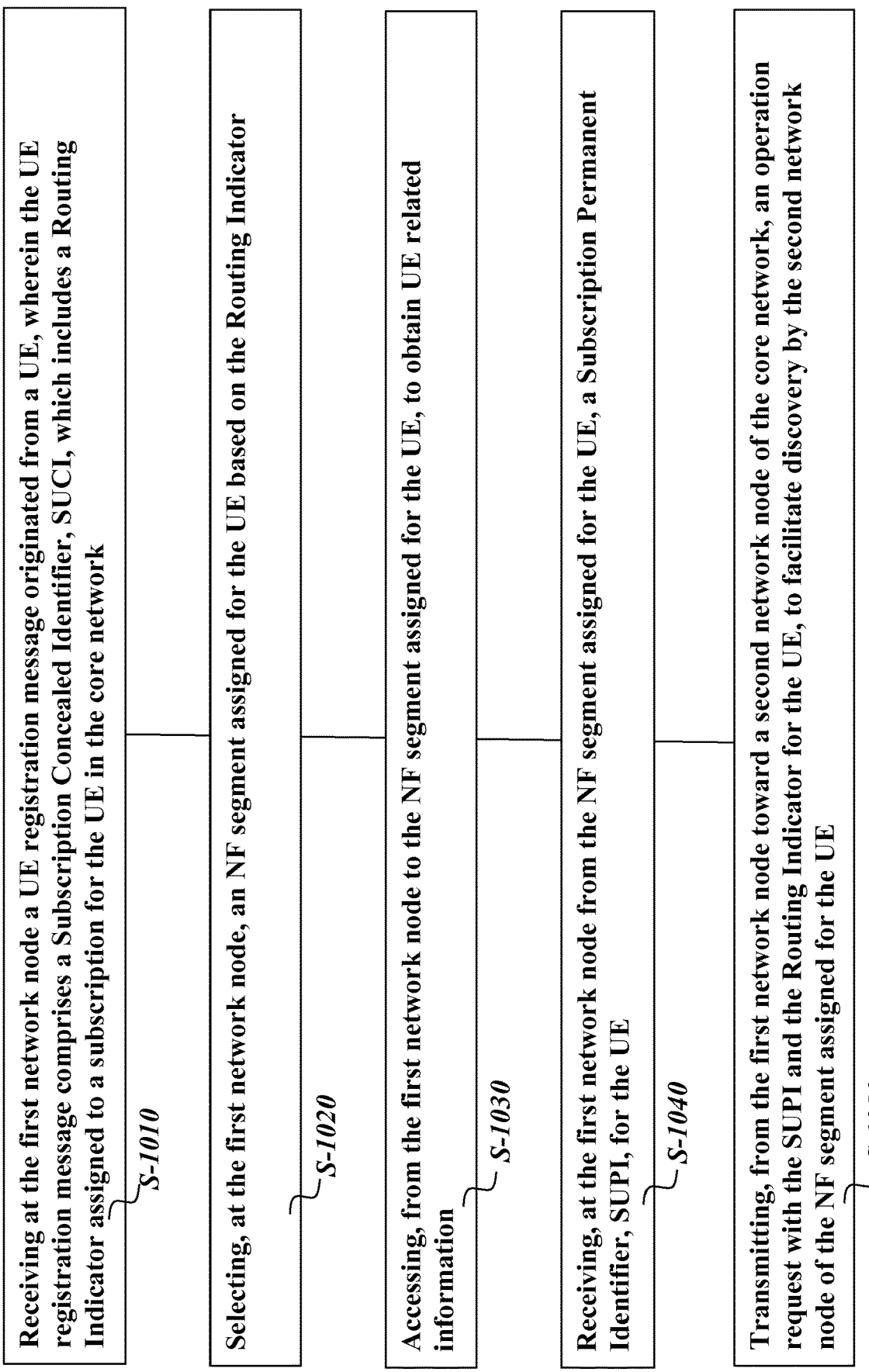
FIG. -10-

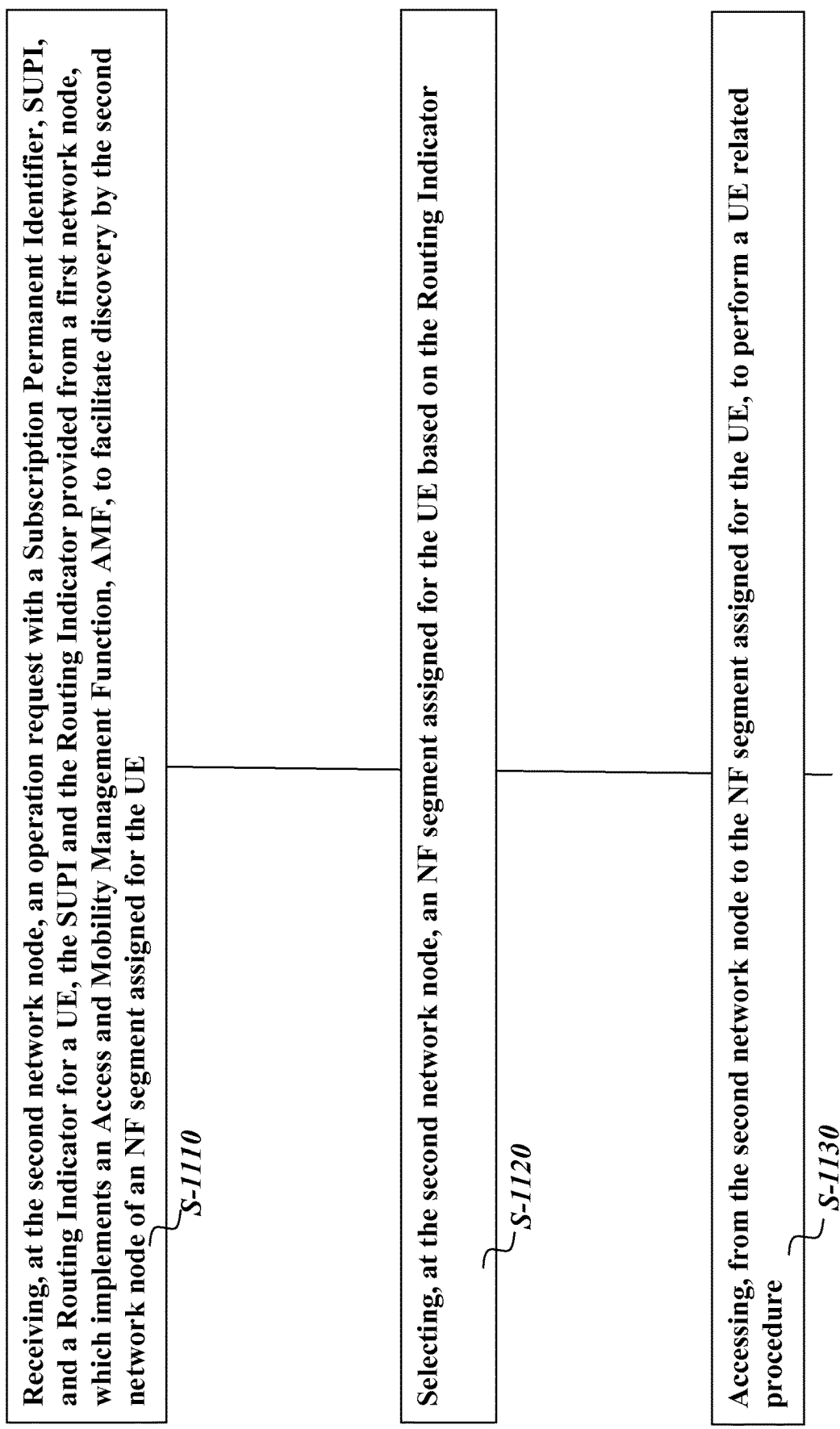
FIG. -11-

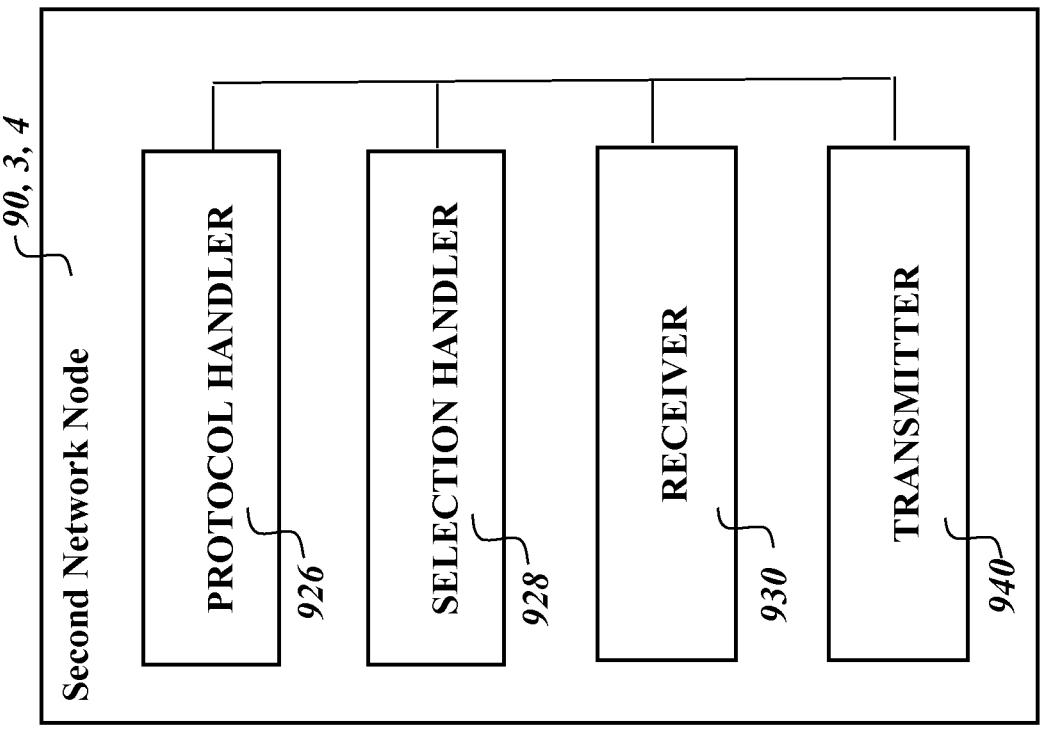
FIG. -12-
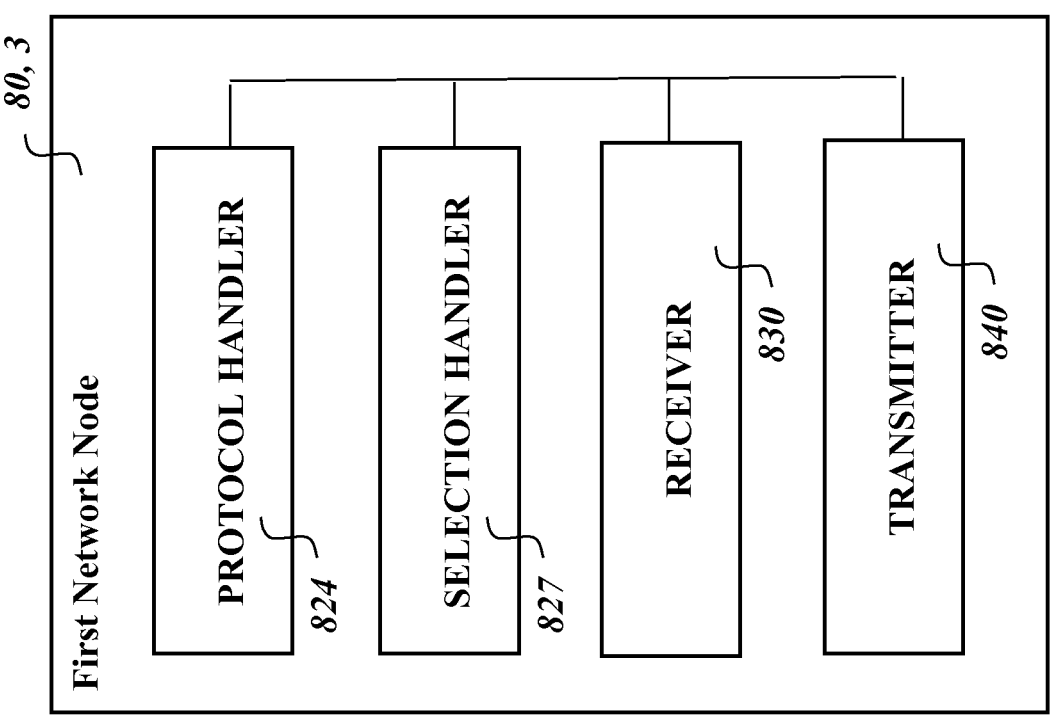
FIG. -13-

METHODS AND APPARATUSES FOR NETWORK FUNCTION SELECTION IN 5G FOR A USER

CROSS-REFERENCE TO RELATED APPLICATIONS

This application is a Submission Under 35 U.S.C. § 371 for U.S. National Stage Patent Application of International Application No.: PCT/EP2019/051924, filed Jan. 25, 2019 entitled "METHODS AND APPARATUSES FOR NETWORK FUNCTION SELECTION IN 5G FOR A USER," which claims priority to European Application No.: 18000897.1, filed Nov. 14, 2018, the entireties of both of which are incorporated herein by reference.

TECHNICAL FIELD

The present invention generally relates to network function selection for a user in a 5G network; and, more specifically, the invention applies when the selection criteria is other than ranges of user identifiers.

BACKGROUND

3GPP TS 23.501 v15.3.0 defines a Network Function (NF) as a 3GPP adopted or 3GPP defined processing function in a 5G network, which has defined functional behaviour and 3GPP defined interfaces. A NF can be implemented either as a network element on a dedicated hardware, as a software instance running on a dedicated hardware. For example, FIG. 1 shows a non-roaming 5G System architecture.

3GPP TS 23.501 defines the 5G System Architecture as a Service Based Architecture (SBA) for the control plane (CP), wherein each NF (as an NF producer) may provide one or more NF services to one or more NF consumers through a service-based interface (SBI) or reference point. An NF service is a type of capability exposed by an NF (NF Service Producer) to other authorized NF (NF Service Consumer) through the service-based interface (SBI) or reference point. An NF service may support one or more NF service operations.

NF discovery and NF service discovery enable an NF to discover a set of NF instances with a specific NF service or a target NF type. The NF Repository Function (NRF) supports the NF discovery and NF service discovery. To this end, as at least partially illustrated in FIG. 2 and FIG. 3, the NRF receives registration and deregistration from an NF service producer, allows discovery and selection of available NF service producers by an NF service consumer, and authorizes an NF service consumer to access to an NF service producer. The NF service discovery function, enabled by NRF, provides the address of the NF instances that exist in a network to provide an NF service and all necessary information to issue and route requests towards the selected target NF producer (i.e. protocol, port, FQDN and/or IP address of target NF instance amongst other parameters required to create a URI used in the http request).

Amongst others, as shown in FIG. 1, a 5G Core (5GC) network comprises as NFs: an Authentication Server Function (AUSF), an Access and Mobility Management Function (AMF), a Session Management Function (SMF), a User Plane Function (UPF), the NRF commented above, a Unified Data Management (UDM) entity that stores subscriber data and, in a layered architecture, the UDM stores data in a Unified Data Repository (UDR), which supports storage and retrieval of: subscription data by e.g. UDM, policy data by e.g. a Policy Control Function (PCF), and structured data for exposure, and application data for application detection, by e.g. a Network Exposure Function (NEF).

The NF consumer uses the discovery result to select a specific NF producer instance that can provide an NF service (e.g. an instance of the UDM within a given PLMN/Slice). The NF consumer may use the information from a previously stored discovery result for subsequent NF service selections (i.e. the discovery results can be cached by the requester NF, so it does not need to trigger a new NF discovery procedure to perform the selection).

Some deployments of 5GC can define segments of any NF, wherein each segment manages a different set of users within the HPLMN. For example, regional AUSF/UDM/UDR deployments (segments) facilitate the administration of the subscription base within a large PLMN. For these scenarios, 3GPP has defined the possibility for AUSF/UDM/UDR to register in NRF using segment parameters provided to NF consumers during AUSF/UDM/UDR discovery to facilitate the selection of the right AUSF/UDM/UDR instance for a given UE.

The segment parameters usable for registration and discovery of NF services with the NRF can be one or more of the parameters defined in 3GPP TS 29.510 v15.1.0 per NF basis and exemplary disclosed for AUSF, UDM and UDR in following tables:

TABLE 6.1.6.2.8-1

Definition of type AusfInfo

| Attribute name | Data type | P | Cardinality | Description |
| --- | --- | --- | --- | --- |
| groupId | string | O | 0 . . . 1 | Identity of the AUSF group |
| supiRanges | array(SupiRange) | O | 0 . . . N | List of ranges of SUPIs that can be served by the AUSF instance. If not provided, the AUSF can serve any SUPI. |
| routingIndicators | array(string) | O | 0 . . . N | List of Routing Indicator information that allows to route network signalling with SUCI (see 3GPP TS 23.003 [12]) to the AUSF instance |

TABLE 6.1.6.2.7-1

Definition of type UdmInfo

| Attribute name | Data type | P | Cardinality | Description |
|---|---|---|---|---|
| groupId | String | O | 0 . . . 1 | Identity of the UDM group that is served by the UDM instance |
| supiRanges | array(SupiRange) | O | 0 . . . N | List of ranges of SUPIs whose profile data is available in the UDM instance (NOTE 1) |
| gpsiRanges | array(IdentityRange) | O | 0 . . . N | List of ranges of GPSIs whose profile data is available in the UDM instance (NOTE 1) |
| externalGroupIdentifiersRanges | array(IdentityRange) | O | 0 . . . N | List of ranges of external groups whose profile data is available in the UDM instance (NOTE 1) |
| routingIndicators | array(string) | O | 0 . . . N | List of Routing Indicator information that allows to route network signalling with SUCI (see 3GPP TS 23.003 [12]) to the UDM instance. |

(NOTE 1):
If none of these parameters is provided, the UDM can serve any external group and any SUPI or GPSI.

TABLE 6.1.6.2.6-1

Definition of type UdrInfo

| Attribute name | Data type | P | Cardinality | Description |
|---|---|---|---|---|
| groupId | string | O | 0 . . . 1 | Identity of the UDR group that is served by the UDR instance |
| supiRanges | array(SupiRange) | O | 0 . . . N | List of ranges of SUPI's whose profile data is available in the UDR instance (NOTE 1) |
| gpsiRanges | array(IdentityRange) | O | 0 . . . N | List of ranges of GPSIs whose profile data is available in the UDR instance (NOTE 1) |
| externalGroupIdentifiersRanges | array(IdentityRange) | O | 0 . . . N | List of ranges of external groups whose profile data is available in the UDR instance (NOTE 1) |
| supportedDataSets | array(DataSetId) | O | 0 . . . N | List of supported data sets in the UDR instance |

(NOTE 1):
If none of these parameters is provided, the UDR can serve any external group and any SUPI or GPSI.

The Routing Indicator, also referred to as Routing ID, is of relevance during initial interactions with the UE for AUSF selection. The UE never provides a Subscription Permanent Identifier (SUPI) in clear text to the 5GC, so during an initial registration the UE provides a concealed SUPI, i.e. a Subscription Concealed Identifier (SUCI). The SUCI includes enough routing information for the authentication signaling to take place including PLMN id (e.g. MNC/MCC) and, where segments of AUSF/UDM/UDRs managing different sets of users within the HPLMN have been deployed, the SUCI also includes a Routing Indicator.

The use of the Routing Indicator to route the UE authentication requests to the right AUSF/UDM/UDR segment of the UE represented by the SUCI is illustrated in FIG. 4. With reference to FIG. 4, the following actions occur:

(a) UDM and AUSF register in NRF at PLMN/NSSAI level, including relevant segment parameters (e.g. SUPI Range and Routing Indicator).

(1) The AMF receives a Registration Request for a UE identified by a SUCI. The SUCI includes a Routing Indicator (e.g. Routing Indicator 2).

(b) If not already done, AMF interacts with NRF to discover the registered instances of AUSF available at e.g. PLMN ID. The AMF may also include the Routing ID value received from the UE within the SUCI. The results from this type of NRF discovery results can be cached in the AMF for use in AUSF selection of UE procedures from different users which also matches the same criteria (e.g. SUPI Range and Routing ID or, alternatively, all AUSFs at the PLMN).

The AMF selects an applicable AUSF instance for the UE request. Since the SUPI is not yet available at AMF, the AUSF selection in AMF cannot be based on the SUPI Range the user SUPI belongs to, so in this case the AMF selects an AUSF instance based on the Routing Indicator presented by the UE within the SUCI. This was the original purpose for the definition of Routing ID, to assist the AUSF selection in network signaling using SUCI.

(2) The AMF interacts with the selected AUSF instance to authenticate the user. Mind that AUSF also makes use of the Routing Identifier within the SUCI to select an appropriate UDM instance. After successful authentication, the AMF receives the SUPI from AUSF.

(3) UDM selection in AMF can be done based on the SUPI Range the user SUPI belongs to. It is however assumed that it is possible for the AMF to select a UDM for the UE also based on the Routing ID received as part of the SUCI from the UE. It is understood that the Routing ID can be included as part of the UE context kept in AMF together with the user SUPI for this purpose.

At present, some operators are not able to perform the AUSF/UDM/UDR segmentation using SUPI ranges. In this cases, AUSF/UDM/UDR are not expected to register in NRF using this segment parameter and thus they would not be able to be discovered and selected for a given UE procedure based on the SUPI range that the user SUPI belongs to. As discussed above, AUSF and UDM selection in AMF can be based on the Routing ID provided by the UE within the SUCI.

However, when the AMF further interacts with other NFs within the 5GC only the SUPI is provided. For example, when the AMF interacts with an SMF within the 5GC to establish a PDU session for the UE, only the SUPI is provided from the AMF to the SMF. When the SMF requires to contact the UDM, it may lack relevant information to identify the UDM segment in charge of the SUPI and perform UDM selection using the information regularly cached from the NRF. Unless the AUSF/UDM/UDR segments follow a strict SUPI range split, the SMF will be forced to execute an additional UDM discovery request to NRF based on SUPI in order to receive information of the UDM instances registered in NRF to serve that user. For that, the NRF requires to keep a mapping of the relation of a given SUPI with its assigned Routing ID and UDM Group ID.

Furthermore, when the AMF interacts with a Short Message Service Function (SMSF) within the 5GC to establish the SMS over NAS delivery channel for the UE, the SMSF also lacks relevant information to identify the UDM segment in charge of the SUPI and yet another UDM discovery request to NRF based on SUPI is required between the SMSF and the NRF.

Same situation occurs in the context of an inter AMF mobility procedure and in the context of re-authentication requests to AUSF using SUPI instead of SUCI.

An exemplary situation where AUSF/UDM/UDR segments cannot be performed using SUPI ranges is shown in FIG. 5, which illustrates a UDM discovery and selection in SMF/SMSF and other AMFs regarding a SUPI based NRF discovery.

As shown in FIG. 5, when the AMF 3b interacts with an SMF 4a within the 5GC to establish a PDU session for the UE (represented by action 2 in FIG. 5), only the SUPI is provided to SMF by the AMF. When SMF 4a requires to contact the UDM, it may lack relevant addressing information to identify the UDM segment related to the SUPI and perform UDM selection using the information regularly cached from the NRF 2. Unless, the AUSF/UDM/UDR segments follows a strict SUPI range split, the SMF 4a is forced to execute an additional UDM discovery request to NRF based on SUPI (represented by action 2a in FIG. 5) in order to receive information of the UDM instances registered in NRF to serve that user. For that, the NRF requires to keep a mapping of the relation of a given SUPI with its assigned UDM Routing ID and UDM Group ID.

Furthermore, when the AMF 3b interacts with an SMSF 4b within the 5GC to establish the SMS over NAS delivery channel for the UE (represented by action 3 in FIG. 5), the SMSF will also lack relevant addressing information to identify the UDM segment related to the SUPI and yet another UDM discovery request to NRF 2 based on SUPI is required between the SMSF 4b and the NRF 2 (represented by action 3a in FIG. 5).

Same applies in the context of a inter AMF mobility procedure (e.g. between AMF 3b and AMF 3a) where UE context information may not include the Routing ID, and in the context of re-authentication requests to AUSF using SUPI instead of SUCI (represented by actions 4 and 4a in FIG. 5).

In these situations, even if the AMF receiving a Registration Request for a UE identified by a SUCI with a Routing ID had resolved the right AUSF/UDM segment for the UE based on the received Routing ID, other NFs within the 5GC (e.g. SMF, SMSF and even other AMFs) are forced to perform further discovery requests to the NRF based on SUPI for each UE.

This represents a significant and non-neglectable amount of signaling towards the NRF. Additionally, this implies additional delays in the UE traffic procedures while establishing PDU sessions, establishing the SMS over NAS channel, and/or completing inter AMF mobility and re-authentication procedures.

Mind as well that NRF design is suited for off-line traffic, independent in most of the cases of UE procedures, and this amount of signaling related to SUPI based discovery requests from SMF, SMSF, AMF may negatively impact the normal operation and performance of the NRF. NF producers, as the results of SUPI based discovery requests, cannot be cached in NF consumers for use with network procedures related to other SUPIs.

SUMMARY

The present invention is aimed to overcome these drawbacks and provides for an improved 5GC NF selection process in scenarios wherein e.g. AUSF/UDM/UDR segments manage different sets of users and wherein AUSF/UDM/UDR segmentation is not based on SUPI ranges.

For the sake of simplicity, any AUSF instance, UDM instance, UDR instance as well as any other NF instance, in scenarios with segmentation based on segment parameters as discussed above, may be hereinafter referred to as NF segments.

In accordance with this specification, there is provided a new procedure of accessing an NF segment, wherein registration and discovery is based on Routing ID, and wherein the Routing ID, which is received with a SUCI identifying a UE, is included in any interaction between 5GC NFs. That is, each NF segment (i.e. an NF provider) registers in the NRF with a Routing ID, as illustrated in FIG. 2, and any NF consumer discovers an NF segment (i.e. an NF provider) with a Routing ID in the NRF, as illustrated in FIG. 3.

In accordance with a first aspect of the present invention, there is provided a method of accessing an NF segment by an NF consumer, wherein the NF segment corresponds to an NF producer instance in charge of a set of UEs for subscribers of a core network, this method being executed at a first network node that implements an AMF.

This method comprises, at the first network node, receiving a UE registration message originated from a UE, wherein the UE registration message comprises a SUCI which includes a Routing Indicator assigned to a subscription for the UE in the core network, and selecting an NF segment assigned for the UE based on the Routing Indicator.

This method also comprises, at the first network node, accessing, to the NF segment assigned for the UE, to obtain UE related information, receiving, from the NF segment assigned for the UE, a SUPI for the UE, and transmitting, toward a second network node of the core network, an operation request with the SUPI and the Routing Indicator for the UE, to facilitate discovery by the second network node of the NF segment assigned for the UE.

This method may comprise storing, at the first network node, the SUPI and the Routing Indicator for the UE.

In an embodiment of this method, selecting the NF segment assigned for the UE based on the Routing Indicator may comprise at the first network node discovering, from an NRF node, addressing information to access a plurality of NF segments registered in the NRF node and, for each NF segment, an assigned Routing Indicator, storing the addressing information for the plurality of NF segments and, for each NF segment, the assigned Routing Indicator, and determining the addressing information to access the NF segment assigned for the UE based on the Routing Indicator.

In another embodiment of this method, selecting the NF segment assigned for the UE based on the Routing Indicator may comprise at the first network node discovering, from an NRF node, addressing information to access an NF segment assigned for the UE based on the Routing Indicator, and storing the addressing information for the NF segment assigned for the UE and the assigned Routing Indicator.

In accordance with a second aspect of the present invention, there is provided a method of accessing an NF segment by an NF consumer, wherein the NF segment corresponds to an NF producer instance in charge of a set of UEs for subscribers of a core network, this method being executed at a second network node of the core network.

This method comprises, at the second network node, receiving an operation request with a SUPI and a Routing Indicator for a UE, the SUPI and the Routing Indicator provided from a first network node, which implements an AMF, to facilitate discovery by the second network node of an NF segment assigned for the UE, selecting an NF segment assigned for the UE based on the Routing Indicator, and accessing, to the NF segment assigned for the UE, to perform a UE related procedure.

This method may further comprise storing, at the second network node, the SUPI and the Routing Indicator for the UE.

In an embodiment of this method, selecting the NF segment assigned for the UE based on the Routing Indicator may comprise at the second network node discovering, from an NRF node, addressing information to access a plurality of NF segments registered in the NRF node and, for each NF segment, an assigned Routing Indicator, storing the addressing information for the plurality of NF segments and, for each NF segment, the assigned Routing Indicator, and determining the addressing information to access the NF segment assigned for the UE based on the Routing Indicator.

In another embodiment of this method, selecting the NF segment assigned for the UE based on the Routing Indicator may comprise at the second network node discovering, from an NRF node, addressing information to access an NF segment assigned for the UE based on the Routing Indicator, and storing the addressing information for the NF segment assigned for the UE and the assigned Routing Indicator.

In both methods discussed above, the second network node may implement any one of: an AUSF, a UDM, an SMF, an SMSF and a further AMF. Also, in both methods the NF segment assigned for the UE may implement any one of: an AUSF instance, a UDM instance and a UDR instance.

Also, in both methods discussed above, the plurality of NF segments registered in the NRF node may correspond to all NF segments in the PLMN or in the Home PLMN.

In accordance with a third aspect of the present invention, there is provided a first network node, which implements an AMF, for facilitating access to an NF segment by an NF consumer, wherein the NF segment corresponds to an NF producer instance in charge of a set of UEs for subscribers of a core network.

This first network node is operable to receive, via a receiver, a UE registration message originated from a UE, wherein the UE registration message comprises a SUCI, which includes a Routing Indicator assigned to a subscription for the UE in the core network, and select an NF segment assigned for the UE based on the Routing Indicator.

This first network node is also operable to access, via a transmitter to the NF segment assigned for the UE, to obtain UE related information, receive, via the receiver from the NF segment assigned for the UE, a SUPI for the UE, and transmit, via the transmitter toward a second network node of the core network, an operation request with the SUPI and the Routing Indicator for the UE, to facilitate discovery by the second network node of the NF segment assigned for the UE.

In an embodiment for selecting the NF segment assigned for the UE based on the Routing Indicator, the first network node may further be operable to discover, via the receiver from an NRF node, addressing information to access a plurality of NF segments registered in the NRF node and, for each NF segment, an assigned Routing Indicator, store at a data memory the addressing information for the plurality of NF segments and, for each NF segment, the assigned Routing Indicator, and determine the addressing information to access the NF segment assigned for the UE based on the Routing Indicator.

In another embodiment for selecting the NF segment assigned for the UE based on the Routing Indicator, the first network node may further be operable to discover, via the receiver from an NRF node, addressing information to access an NF segment assigned for the UE based on the Routing Indicator, and store at a data memory the addressing information for the NF segment assigned for the UE and the assigned Routing Indicator.

In accordance with a fourth aspect of the present invention, there is provided a second network node of the core network for accessing an NF segment as an NF consumer, wherein the NF segment corresponds to an NF producer instance in charge of a set of UEs for subscribers of the core network.

This second network node is operable to receive, via a receiver, an operation request with a SUPI and a Routing Indicator for a UE, the SUPI and the Routing Indicator provided from a first network node, which implements an AMF, to facilitate discovery by the second network node of an NF segment assigned for the UE, select an NF segment assigned for the UE based on the Routing Indicator, and access, via a transmitter to the NF segment assigned for the UE, to perform a UE related procedure.

In an embodiment for selecting the NF segment assigned for the UE based on the Routing Indicator, the second network node may further be operable to discover, via the receiver from an NRF node, addressing information to access a plurality of NF segments registered in the NRF node and, for each NF segment, an assigned Routing Indicator, store at a data memory the addressing information for the plurality of NF segments and, for each NF segment, the assigned Routing Indicator, and determine the addressing information to access the NF segment assigned for the UE based on the Routing Indicator.

In another embodiment for selecting the NF segment assigned for the UE based on the Routing Indicator, the second network node may further be operable to discover, via the receiver from an NRF node, addressing information to access an NF segment assigned for the UE based on the Routing Indicator, and store at a data memory the addressing information for the NF segment assigned for the UE and the assigned Routing Indicator.

Any one of first network node and second network node may further be operable to store, at a respective data memory, the SUPI and the Routing Indicator for the UE.

For any one of first network node and second network node, the second network node may implement any one of: an AUSF, a UDM, an SMF, an SMSF and a further AMF.

For any one of first network node and second network node, the NF segment assigned for the UE may implement any one of: an AUSF instance, a UDM instance and a UDR instance.

On the other hand, the invention may be practised by a computer program, in accordance with a fifth aspect of the invention, the computer program comprising instructions which, when executed on at least one processor, cause the at least one processor to carry out any one of the methods discussed above.

BRIEF DESCRIPTION OF THE DRAWINGS

The features, objects and advantages of the invention will become apparent by reading this description in conjunction with the accompanying drawings, in which:

FIG. 1 depicts a 5G System Architecture in a non-roaming case.

FIG. 2 shows a Service Registration of an NF service provider in an NRF.

FIG. 3 shows Service Discovery of an NF service provider by an NF service consumer in an NRF.

FIG. 4 illustrates a scenario for AUSF/UDM Discovery and Selection in an AMF, wherein segmentation can be done per SUPI ranges.

FIG. 5 illustrates a scenario for UDM Discovery and Selection in SMF/SMSF and other AMFs, regarding a SUPI based NRF discovery.

FIG. 6 illustrates a scenario for UDM Selection in 5GC NFs (e.g. SMF, SMSF, AMFs) based on Routing ID provided by the AMF, in accordance with an embodiment.

FIG. 7 illustrates an exemplary sequence of actions carried out by AMF and SMF/SMSF, in accordance with an embodiment, for redirection of misconfigured UE/USIMs to the right AUSF/UDM segment.

FIG. 8 shows a basic component structure of a first network node in accordance with an embodiment.

FIG. 9 shows a basic component structure of a second network node in accordance with an embodiment.

FIG. 10 illustrates an exemplary sequence of actions carried out by the first network node, in accordance with an embodiment, to select an NF segment assigned for the UE and to facilitate discovery by a second network node of the NF segment assigned for the UE.

FIG. 11 illustrates an exemplary sequence of actions carried out by the second network node, in accordance with an embodiment, to select an NF segment assigned for the UE.

FIG. 12 shows a basic component structure of a first network node in accordance with another embodiment.

FIG. 13 shows a basic component structure of a second network node in accordance with another embodiment.

DETAILED DESCRIPTION

The following describes currently preferred embodiments of apparatuses and methods of accessing a NF segment by an NF consumer, wherein the NF segment corresponds to an NF producer instance in charge of a set of UE for subscribers of a core network. More particularly, the following also describes a first network node 80 that implements an AMF 3, a second network node 90 that may implement any one of: an AUSF, a UDM, an SMF, a UDR, a SMSF, and a further AMF, and respectively executed methods of accessing a NF segment by an NF consumer, wherein the NF segment corresponds to an NF producer instance in charge of a set of UE for subscribers of a core network.

The teaching throughout this specification generally applies in scenarios wherein segments of e.g. AUSF/UDM/UDR managing different sets of users within the HPLMN are deployed, and wherein the AUSF/UDM/UDR segmentation is not based on SUPI ranges.

An inventive concept discussed in this specification considers the Routing ID provided by the UE not only related to the SUCI but also as an extension of the SUPI. Following this concept, the proposal is that the Routing ID is included in any interaction between 5GC NFs. In this way, the AMF receiver of the Routing ID can provide to other NFs within the 5GC (e.g. SMF, SMSF, AUSF and other AMFs) with the Routing ID to help these NFs to identify the UDM segment related to a given SUPI.

In this respect, FIG. 6 illustrates a scenario where this concept is applied for UDM selection in 5GC NFs (e.g. SMF, SMSF, AMF) as follows:

Action (1). After successful authentication and registration of the UE, the AMF 3b stores the SUPI and the Routing ID as part of the UE context.

Action (2). When the AMF 3b interacts with an SMF 4a within the 5GC to establish a PDU session for the UE, the AMF 3b provides the Routing ID in addition to the SUPI to the SMF 4a so that SMF can make selection of the appropriate UDM instance for that SUPI also based on the Routing ID provided.

Action (3). Similarly, when the AMF 3b interacts with an SMSF 4b within the 5GC to establish the SMS over NAS delivery channel for the UE, the AMF 3b also provides the Routing ID in addition to the SUPI to the SMSF 4b for the same purpose.

Action (4). Finally, the Routing ID, as part of the UE context, is also transferred from one AMF 3b to another AMF 3a, during inter AMF mobility procedures.

In all these cases, the SMF 4a, SMSF 4b, or other AMF 3a may interact with the NRF 2 to discovery available UDM instances 5d-5f supporting the Routing ID provided by the AMF 3b. Mind however that the results of these discovery requests are of general applicability to further UE procedures from other SUPIs but matching the same Routing ID value.

The improvement and optimization in e.g. UDM selection process executed in 5GC NFs (e.g. AUSF, AMF, SMF and/or SMSF), as proposed in this specification, allows a significant reduction of NRF traffic in scenarios wherein segments of e.g. AUSF/UDM/UDRs, managing different sets of users within the HPLMN, are deployed and the AUSF/UDM/UDR segmentation is not based on SUPI ranges.

Additionally, by avoiding NRF interactions during the execution of related UE traffic procedures, the latency in these procedures does not suffer any unnecessary delays. Also, UDM NF consumers can optimize the storage of UDM discovery procedures, as SUPI based UDM discovery requests can be avoided, or at least minimized, and all NRF discovery results could be cached and used for UDM selection in the context of multiple SUPIs.

The improvement and optimization in e.g. AUSF/UDM selection process executed in e.g. AMF and SMF/SMSF is disclosed in the following with reference to FIG. 7.

The AUSF/UDM 5a and 5b in the different segments register in NRF 2 during step S-700 and using its segment parameters (i.e. Routing ID). Range of SUPIs is not used as segment parameter in the HPLMN. Then, other NFs, e.g. AMF 3 and SMF/SMSF 4, can discover during step S-705 the available AUSF/UDM instances 5a and 5b per segment.

The UE initiates during step S-710 a connection to the 5GC via an AMF 3 using an encrypted SUPI, i.e. SUCI which includes the Routing ID (e.g. RoutingID #2) assigned to the subscription in the USIM.

The AMF 3 selects during step S-715 an AUSF/UDM instance with the received Routing ID (e.g. RoutingID #2) and interacts during step S-720 with an AUSF/UDM instance 5b in Segment #2 of the HPLMN based on the Routing ID provided by the UE (e.g. RoutingID #2) and the information regarding available AUSF/UDM instances stored in the AMF as result of AUSF/UDM discovery procedures with NRF 2 disclosed above during step S-705. In this interaction, the AMF 3 obtains a SUPI for the UE.

The Routing ID provided by the UE and the SUPI may be part of the UE context stored at the AMF 3.

Then, the AMF 3 interacts during step S-725 with an SMF/SMSF 4, and includes the Routing ID related to the SUPI in the corresponding Nsmf/Nsmsf request (e.g. Nsmf_PDUSession_Create service operation in case of SMF or Nsmsf_SMSService_Activate service operation in case of SMSF).

The SMF/SMSF 4 selects during step S-730 a UDM instance with the received Routing ID (e.g. RoutingID #2) and based on the information regarding available AUSF/UDM instances stored in the SMF/SMSF 4 as result of AUSF/UDM discovery procedures with NRF 2 disclosed above during step S-705. This can be done without the need for the SMF/SMSF to trigger a UDM discovery request to NRF based on SUPI using information received previously from the NRF.

Eventually, the SMF/SMSF 4 interacts during step S-735 with the selected UDM instance in the appropriate Segment #2 assigned to the UE.

In addition to the Routing ID received from the UE, the AMF may also be aware of the Group ID of the AUSF/UDM instances applicable for the SUPI and Routing ID. The information regarding the AUSF/UDM Group ID is included in the NF profile downloaded from the NRF and may be used to associate a given SUPI with a given Routing ID and a given AUSF/UDM Group ID. The AUSF and UDM Group IDs may also be stored within the UE context associated with the SUPI and the Routing ID in the AMF. The stored AUSF/UDM Group ID may also be provided to other NFs within the 5GC in addition to the Routing ID.

FIG. 10 illustrates a method of accessing an NF segment by an NF consumer, wherein the NF segment corresponds to an NF producer instance in charge of a set of UE for subscribers of a core network.

This method is executed at a first network node 80 that implements an AMF 3. As illustrated in FIG. 10, this method comprises receiving during step S-1010 a UE registration message originated from a UE, wherein the UE registration message comprises a SUCI with a Routing Indicator assigned to a subscription for the UE in the core network; selecting during step S-1020 an NF segment assigned for the UE based on the Routing Indicator; and accessing during step S-1030, to the NF segment assigned for the UE, to obtain UE related information.

Responsive to the accessing step, this method also comprises receiving during step S-1040, from the NF segment assigned for the UE, a SUPI for the UE; and transmitting during step S-1050, toward a second network node 90 of the core network, an operation request with the SUPI and the Routing Indicator for the UE, to facilitate discovery by the second network node of the NF segment assigned for the UE.

This method illustrated in FIG. 10 may further comprise storing, i.e. caching, the SUPI and the Routing Indicator for the UE to be further used for other SUPIs for other UEs involving the same Routing Indicator.

In an embodiment, the step of selecting the NF segment assigned for the UE based on the Routing Indicator may comprise: discovering, from an NRF node 2, addressing information to access a plurality of NF segments 5a-5b registered in the NRF node and, for each NF segment, an assigned Routing Indicator; storing the addressing information for the plurality of NF segments 5a-5b and, for each NF segment, the assigned Routing Indicator; and determining the addressing information to access the NF segment 5b assigned for the UE based on the Routing Indicator.

In an alternative embodiment, the step of selecting the NF segment assigned for the UE based on the Routing Indicator may comprise: discovering, from an NRF node 2, addressing information to access an NF segment 5b assigned for the UE based on the Routing Indicator; and storing the addressing information for the NF segment 5b assigned for the UE and the assigned Routing Indicator.

FIG. 11 illustrates a method of accessing an NF segment by an NF consumer, wherein the NF segment corresponds to an NF producer instance in charge of a set of UE for subscribers of a core network.

This method is executed at a second network node 90 of the core network. As illustrated in FIG. 11, this method comprises receiving during step S-1110 an operation request with a SUPI and a Routing Indicator for a UE, the SUPI and the Routing Indicator provided from a first network node 80, which implements an AMF 3, to facilitate discovery by the second network node of an NF segment assigned for the UE; selecting during step S-1120 an NF segment assigned for the UE based on the Routing Indicator; and accessing during step S-1130, to the NF segment 5b assigned for the UE, to perform a UE related procedure.

This method illustrated in FIG. 11 may further comprise storing, i.e. caching, the SUPI and the Routing Indicator for the UE to be further used for other SUPIs for other UEs involving the same Routing Indicator.

In an embodiment of this method, the step of selecting the NF segment assigned for the UE based on the Routing Indicator may comprise: discovering, from an NRF node 2, addressing information to access a plurality of NF segments 5a-5b registered in the NRF node and, for each NF segment, an assigned Routing Indicator; storing the addressing information for the plurality of NF segments 5a-5b and, for each NF segment, the assigned Routing Indicator; and determining the addressing information to access the NF segment 5b assigned for the UE based on the Routing Indicator.

In an alternative embodiment of this method, the step of selecting the NF segment assigned for the UE based on the Routing Indicator may comprise: discovering, from an NRF node 2, addressing information to access an NF segment 5b assigned for the UE based on the Routing Indicator; and storing the addressing information for the NF segment 5b assigned for the UE and the assigned Routing Indicator.

In both methods discussed above with reference to FIG. 10 and FIG. 11, the second network node may implement any one of: an AUSF, a UDM, an SMF, an SMSF, and a further AMF.

Also, in both methods discussed above with reference to FIG. 10 and FIG. 11, the NF segment assigned for the UE may implement any one of: an AUSF instance, a UDM instance and a UDR instance.

Also, in both methods discussed above with reference to FIG. 10 and FIG. 11, the plurality of NF segments 5a-5b registered in the NRF node may correspond to all NF segments in the PLMN or in the Home PLMN.

On the other hand, the first network node 80 and the second network node 90 are described in the following with reference to specific implementations as respectively illustrated in FIG. 8 and FIG. 9, in one embodiment, and as respectively illustrated in FIG. 12 and FIG. 13, in another embodiment. Both embodiments for the first network node, which are discussed with reference to FIG. 8 and FIG. 12, may be combined with any one of embodiments for the second network node, which are discussed with reference to FIG. 9 and FIG. 13.

In accordance with an embodiment illustrated in FIG. 8, the first network node, which may implement an AMF 3, may comprise at least one processor 820, and at least one memory 810 that stores processor-executable instructions 814. In this first network node, the at least one processor interfaces with the at least one memory to execute the processor-executable instructions, whereby the first network node is operable to perform the actions disclosed in the following.

The first network node may be operable to receive, via a receiver 830, a UE registration message originated from a UE 1, wherein the UE registration message comprises a SUCI which includes a Routing Indicator assigned to a subscription for the UE in the core network, select an NF segment 5b assigned for the UE based on the Routing Indicator, access, via a transmitter 840 to the NF segment assigned for the UE, to obtain UE related information, receive a SUPI for the UE, via the receiver 830 from the NF segment assigned for the UE, and transmit, via the transmitter 840 toward a second network node 90 of the core network, an operation request with the SUPI and the Routing Indicator for the UE, to facilitate discovery by the second network node of the NF segment assigned for the UE.

The first network node may further be operable to store, at a data memory 818, the SUPI and the Routing Indicator for the UE.

In an embodiment for selecting the NF segment assigned for the UE based on the Routing Indicator, the first network node may further be operable to discover, via the receiver 830 from an NRF node 2, addressing information to access a plurality of NF segments 5a-5b registered in the NRF node and, for each NF segment, an assigned Routing Indicator, store at the data memory 818, the addressing information for the plurality of NF segments 5a-5b and, for each NF segment, the assigned Routing Indicator, and determine the addressing information to access the NF segment 5b assigned for the UE based on the Routing Indicator.

In another embodiment for selecting the NF segment assigned for the UE based on the Routing Indicator, the first network node may further be operable to discover, via the receiver 830 from an NRF node 2, addressing information to access an NF segment 5b assigned for the UE based on the Routing Indicator, and store, at a data memory 818, the addressing information for the NF segment 5b assigned for the UE and the assigned Routing Indicator.

In an embodiment, a protocol handler 824 running in a processor 820 may receive the UE registration message originated from the UE 1, may access to the NF segment 5b assigned for the UE, may receive the SUPI for the UE and may transmit the operation request with the SUPI and the Routing Indicator for the UE; and a selection handler 827 running in a processor 820 may select the NF segment 5b assigned for the UE based on the Routing Indicator.

In a sub-embodiment for selecting the NF segment assigned for the UE based on the Routing Indicator, the selection handler 827 may participate in discovering from the NRF node 2 the addressing information to access a plurality of NF segments registered in the NRF node and, for each NF segment, an assigned Routing Indicator, in storing at the data memory 818 the addressing information for the plurality of NF segments and, for each NF segment, the assigned Routing Indicator, and in determining the addressing information to access the NF segment 5b assigned for the UE based on the Routing Indicator.

In another sub-embodiment for selecting the NF segment assigned for the UE based on the Routing Indicator, the selection handler 827 may participate in discovering from the NRF node 2 the addressing information to access an NF segment 5b assigned for the UE based on the Routing Indicator, and in storing at a data memory 818, the addressing information for the NF segment 5b assigned for the UE and the assigned Routing Indicator.

If required at all, the first network node 80 may be complemented with a data section 818 in memory to store SUPI and Routing Indicator for a number of UEs and, optionally, addressing information for the NF segments assigned for each UE.

The first network node 80 illustrated in FIG. 8 may thus comprise the at least one processor 820 and the at least one memory 810, both in communication with each other, with the protocol handler 824, the selection handler 827, the receiver 830 and the transmitter 840, and with other elements or units of the first network node 80. The at least one memory 810 may comprise volatile and/or non-volatile memory. The at least one memory 810 may have a computer program 814 and data 818 stored therein. The computer program 814 may be loaded in the at least one memory 810 from a computer program product 850, such as any non-transitory computer readable medium, in which the computer program is stored. The data 818 may comprise SUPI and Routing Indicator for a number of UEs and, optionally, addressing information for the NF segments assigned for each UE. The at least one processor 820 may be configured to carry out the functions of the protocol handler 824 and the selection handler 827.

In accordance with another embodiment illustrated in FIG. 12, the first network node 80 may be operable to to receive, via a receiver 830, a UE registration message originated from a UE 1, wherein the UE registration message comprises a SUCI which includes a Routing Indicator assigned to a subscription for the UE in the core network, select an NF segment 5b assigned for the UE based on the Routing Indicator, access, via a transmitter 840 to the NF segment assigned for the UE, to obtain UE related information, receive a SUPI for the UE, via the receiver 830 from the NF segment assigned for the UE, and transmit, via the transmitter 840 toward a second network node 90 of the core network, an operation request with the SUPI and the Routing Indicator for the UE, to facilitate discovery by the second network node of the NF segment assigned for the UE.

Then, also for the embodiment illustrated in FIG. 12, the first network node 80 may further be operable to perform different actions.

In an embodiment for selecting the NF segment assigned for the UE based on the Routing Indicator, the first network node may further be operable to discover, via the receiver 830 from an NRF node 2, addressing information to access a plurality of NF segments 5a-5b registered in the NRF node and, for each NF segment, an assigned Routing Indicator, store the addressing information for the plurality of NF segments 5a-5b and, for each NF segment, the assigned Routing Indicator, and determine the addressing information to access the NF segment 5b assigned for the UE based on the Routing Indicator.

In another embodiment for selecting the NF segment assigned for the UE based on the Routing Indicator, the first network node may further be operable to discover, via the receiver 830 from an NRF node 2, addressing information to access an NF segment 5b assigned for the UE based on the Routing Indicator, and store the addressing information for the NF segment 5b assigned for the UE and the assigned Routing Indicator.

As discussed above in respect of the embodiment illustrated in FIG. 8, also in this embodiment illustrated in FIG. 12, the first network node 80 may also comprise any one of a protocol handler 824 configured to receive the UE registration message originated from the UE 1, access to the NF segment 5b assigned for the UE, may receive the SUPI for the UE and transmit the operation request with the SUPI and the Routing Indicator for the UE; and a selection handler 827 configured to select the NF segment 5b assigned for the UE based on the Routing Indicator.

As for the embodiment illustrated in FIG. 8, in a sub-embodiment of the embodiment illustrated in FIG. 12 for selecting the NF segment assigned for the UE based on the Routing Indicator, the selection handler 827 may participate in discovering from the NRF node 2 the addressing information to access a plurality of NF segments registered in the NRF node and, for each NF segment, an assigned Routing Indicator, in storing the addressing information for the plurality of NF segments and, for each NF segment, the assigned Routing Indicator, and in determining the addressing information to access the NF segment 5b assigned for the UE based on the Routing Indicator.

In another sub-embodiment of the embodiment illustrated in FIG. 12 for selecting the NF segment assigned for the UE based on the Routing Indicator, the selection handler 827 may participate in discovering from the NRF node 2 the addressing information to access an NF segment 5b assigned for the UE based on the Routing Indicator, and in storing the addressing information for the NF segment 5b assigned for the UE and the assigned Routing Indicator.

In this embodiment of the first network node 80 illustrated in FIG. 12, the protocol handler 824, the selection handler 827, the receiver 830 and the transmitter 840 may be implemented as separate modules comprising hardware and software, and may also be implemented by sharing some hardware and/or software resources amongst any ones of them.

In accordance with an embodiment illustrated in FIG. 9, the second network node 90 may comprise at least one processor 920, and at least one memory 910 that stores processor-executable instructions 914. In this second network node, the at least one processor interfaces with the at least one memory to execute the processor-executable instructions, whereby the second network node is operable to perform the actions disclosed in the following.

The second network node may be operable to receive, via a receiver 930, an operation request with a SUPI and a Routing Indicator for a UE, the SUPI and the Routing Indicator provided from a first network node 80, which implements an AMF 3, to facilitate discovery by the second network node of an NF segment assigned for the UE, select an NF segment 5b assigned for the UE based on the Routing Indicator, and access, via a transmitter 940 to the NF segment 5b assigned for the UE, to perform a UE related procedure.

The second network node may further be operable to store, at a data memory 918, the SUPI and the Routing Indicator for the UE.

In an embodiment for selecting the NF segment assigned for the UE based on the Routing Indicator, the second network node may further be operable to discover, via the receiver 930 from an NRF node 2, addressing information to access a plurality of NF segments 5a-5b registered in the NRF node and, for each NF segment, an assigned Routing Indicator, store at the data memory 918, the addressing information for the plurality of NF segments 5a-5b and, for each NF segment, the assigned Routing Indicator, and determine the addressing information to access the NF segment 5b assigned for the UE based on the Routing Indicator.

In another embodiment for selecting the NF segment assigned for the UE based on the Routing Indicator, the second network node may further be operable to discover, via the receiver 930 from an NRF node 2, addressing information to access an NF segment 5b assigned for the UE based on the Routing Indicator, and store, at a data memory 918, the addressing information for the NF segment 5b assigned for the UE and the assigned Routing Indicator.

In an embodiment, a protocol handler 926 running in a processor 920 may receive the operation request with the SUPI and the Routing Indicator for a UE, wherein the SUPI and the Routing Indicator are provided from a first network node 80 that implements an AMF 3, and may access, via a transmitter 940 to the NF segment 5b assigned for the UE, to perform a UE related procedure; and a selection handler 928 running in a processor 920 may select the NF segment 5b assigned for the UE based on the Routing Indicator.

In a sub-embodiment for selecting the NF segment assigned for the UE based on the Routing Indicator, the selection handler 928 may participate in discovering from the NRF node 2 the addressing information to access a plurality of NF segments registered in the NRF node and, for each NF segment, an assigned Routing Indicator, in storing at the data memory 918 the addressing information for the plurality of NF segments and, for each NF segment, the assigned Routing Indicator, and in determining the addressing information to access the NF segment 5b assigned for the UE based on the Routing Indicator.

In another sub-embodiment for selecting the NF segment assigned for the UE based on the Routing Indicator, the selection handler 928 may participate in discovering from the NRF node 2 the addressing information to access an NF segment 5b assigned for the UE based on the Routing Indicator, and in storing at a data memory 918, the addressing information for the NF segment 5b assigned for the UE and the assigned Routing Indicator.

If required at all, the second network node 90 may be complemented with a data section 918 in memory to store SUPI and Routing Indicator for a number of UEs and, optionally, addressing information for the NF segments assigned for each UE.

The second network node 90 illustrated in FIG. 9 may thus comprise the at least one processor 920 and the at least one memory 910, both in communication with each other, with the protocol handler 926, the selection handler 928, the receiver 930 and the transmitter 940, and with other elements or units of the second network node 90. The at least one memory 910 may comprise volatile and/or non-volatile memory. The at least one memory 910 may have a computer program 914 and data 918 stored therein. The computer program 914 may be loaded in the at least one memory 910 from a computer program product 950, such as any non-transitory computer readable medium, in which the computer program is stored. The data 918 may comprise SUPI and Routing Indicator for a number of UEs and, optionally, addressing information for the NF segments assigned for each UE. The at least one processor 920 may be configured to carry out the functions of the protocol handler 926 and the selection handler 928.

In accordance with another embodiment illustrated in FIG. 13, the second network node 90 may be operable to receive, via a receiver 930, an operation request with a SUPI and a Routing Indicator for a UE, wherein the SUPI and the Routing Indicator are provided from a first network node 80, which implements an AMF, to facilitate discovery by the second network node of an NF segment assigned for the UE, select an NF segment 5b assigned for the UE based on the Routing Indicator, and access, via a transmitter 940 to the NF segment 5b assigned for the UE, to perform a UE related procedure.

Then, also for the embodiment illustrated in FIG. 13, the second network node 90 may further be operable to perform different actions.

In an embodiment for selecting the NF segment assigned for the UE based on the Routing Indicator, the second network node may further be operable to discover, via the receiver 930 from an NRF node 2, addressing information to access a plurality of NF segments 5a-5b registered in the NRF node and, for each NF segment, an assigned Routing Indicator, store the addressing information for the plurality of NF segments 5a-5b and, for each NF segment, the assigned Routing Indicator, and determine the addressing information to access the NF segment 5b assigned for the UE based on the Routing Indicator.

In another embodiment for selecting the NF segment assigned for the UE based on the Routing Indicator, the second network node may further be operable to discover, via the receiver 930 from an NRF node 2, addressing information to access an NF segment 5b assigned for the UE based on the Routing Indicator, and store the addressing information for the NF segment 5b assigned for the UE and the assigned Routing Indicator.

As discussed above in respect of the embodiment illustrated in FIG. 9, also in this embodiment illustrated in FIG. 13, the second network node 90 may also comprise any one of a protocol handler 926 configured to receive the operation request with the SUPI and the Routing Indicator for the UE, wherein the SUPI and the Routing Indicator are provided from a first network node 80 that implements an AMF, and access to the NF segment 5b assigned for the UE to perform the UE related procedure; and a selection handler 928 configured to select the NF segment 5b assigned for the UE based on the Routing Indicator.

As for the embodiment illustrated in FIG. 9, in a sub-embodiment of the embodiment illustrated in FIG. 13 for selecting the NF segment assigned for the UE based on the Routing Indicator, the selection handler 928 may participate in discovering from the NRF node 2 the addressing information to access a plurality of NF segments registered in the NRF node and, for each NF segment, an assigned Routing Indicator, in storing the addressing information for the plurality of NF segments and, for each NF segment, the assigned Routing Indicator, and in determining the addressing information to access the NF segment 5b assigned for the UE based on the Routing Indicator.

In another sub-embodiment of the embodiment illustrated in FIG. 13 for selecting the NF segment assigned for the UE based on the Routing Indicator, the selection handler 928 may participate in discovering from the NRF node 2 the addressing information to access an NF segment 5b assigned for the UE based on the Routing Indicator, and in storing the addressing information for the NF segment 5b assigned for the UE and the assigned Routing Indicator.

In this embodiment of the second network node 90 illustrated in FIG. 13, the protocol handler 926, the selection handler 928, the receiver 930 and the transmitter 940 may be implemented as separate modules comprising hardware and software, and may also be implemented by sharing some hardware and/or software resources amongst any ones of them.

The invention may also be practised by a computer program comprising instructions which, when executed on at least one processor, cause the at least one processor to carry out any one of the methods discussed above. The computer program may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of accessing a Network Function, NF, segment by an NF consumer, the NF segment corresponds corresponding to an NF producer instance in charge of a set of user equipment, UE, for subscribers of a core network, the method executed at a first network node that implements an Access and Mobility Management Function, AMF, and the method comprising:
   receiving at the first network node a UE registration message originated from a UE, the UE registration message comprising a Subscription Concealed Identifier, SUCI, which includes a Routing Indicator assigned to a subscription for the UE in the core network;
   selecting, at the first network node, an NF segment assigned for the UE based on the Routing Indicator;
   accessing, from the first network node to the NF segment assigned for the UE, to obtain UE related information;
   receiving, at the first network node from the NF segment assigned for the UE, a Subscription Permanent Identifier, SUPI, for the UE; and
   transmitting, from the first network node toward a second network node of the core network, an operation request with the SUPI and the Routing Indicator for the UE, to facilitate discovery by the second network node of the NF segment assigned for the UE.

2. The method of claim 1, wherein selecting the NF segment assigned for the UE based on the Routing Indicator comprises:
   discovering, at the first network node from an NF Repository Function, NRF, node, addressing information to access a plurality of NF segments registered in the NRF node and, for each NF segment, an assigned Routing Indicator;
   storing, at the first network node, the addressing information for the plurality of NF segments and, for each NF segment, the assigned Routing Indicator; and
   determining, at the first network node, the addressing information to access the NF segment assigned for the UE based on the Routing Indicator.

3. The method of claim 1, wherein selecting the NF segment assigned for the UE based on the Routing Indicator comprises:
   discovering, at the first network node from an NF Repository Function, NRF, node, addressing information to access an NF segment assigned for the UE based on the Routing Indicator; and
   storing, at the first network node, the addressing information for the NF segment assigned for the UE and the assigned Routing Indicator.

4. A method of accessing a Network Function, NF, segment by an NF consumer, the NF segment corresponding to an NF producer instance in charge of a set of user equipment, UE, for subscribers of a core network, the method executed at a second network node of the core network, and the method comprising:

receiving, at the second network node, an operation request with a Subscription Permanent Identifier, SUPI, and a Routing Indicator for a UE, the SUPI and the Routing Indicator provided from a first network node, which implements an Access and Mobility Management Function (3), AMF, to facilitate discovery by the second network node of an NF segment assigned for the UE;

selecting, at the second network node, an NF segment assigned for the UE based on the Routing Indicator; and accessing, from the second network node to the NF segment assigned for the UE, to perform a UE related procedure.

5. The method of claim 4, wherein selecting the NF segment assigned for the UE based on the Routing Indicator comprises:

discovering, at the second network node from an NF Repository Function, NRF, node, addressing information to access a plurality of NF segments registered in the NRF node and, for each NF segment, an assigned Routing Indicator;

storing, at the second network node, the addressing information for the plurality of NF segments and, for each NF segment, the assigned Routing Indicator; and determining, at the second network node, the addressing information to access the NF segment assigned for the UE based on the Routing Indicator.

6. The method of claim 4, wherein selecting the NF segment assigned for the UE based on the Routing Indicator comprises:

discovering, at the second network node from an NF Repository Function, NRF, node, addressing information to access an NF segment assigned for the UE based on the Routing Indicator; and storing, at the second network node, the addressing information for the NF segment assigned for the UE and the assigned Routing Indicator.

7. The method of claim 1, wherein the second network node implements any one of: an Authentication Server Function, AUSF, a Unified Data Management, UDM, a Session Management Function, SMF, a Short Message Service Function, SMSF, and a further AMF.

8. The method of claim 1, wherein the NF segment assigned for the UE implements any one of: an Authentication Server Function, AUSF, instance, a Unified Data Management, UDM, instance and a Unified Data Repository, UDR, instance.

9. A first network node, which implements an Access and Mobility Management Function, AMF, for facilitating access to a Network Function, NF, segment by an NF consumer, the NF segment corresponding to an NF producer instance in charge of a set of user equipment, UE, for subscribers of a core network, the first network node configured to:

receive, via a receiver, a UE registration message originated from a UE, the UE registration message comprises comprising a Subscription Concealed Identifier, SUCI, which includes a Routing Indicator assigned to a subscription for the UE in the core network;

select an NF segment assigned for the UE based on the Routing Indicator;

access, via a transmitter to the NF segment assigned for the UE, to obtain UE related information;

receive, via the receiver from the NF segment assigned for the UE, a Subscription Permanent Identifier, SUPI, for the UE; and transmit, via the transmitter toward a second network node of the core network, an operation request with the SUPI and the Routing Indicator for the UE, to facilitate discovery by the second network node of the NF segment assigned for the UE.

10. The first network node of claim 9, further configured to store, at a data memory, the SUPI and the Routing Indicator for the UE.

11. The first network node of claim 9, wherein in selecting the NF segment assigned for the UE based on the Routing Indicator, the first network node is further configured to:

discover, via the receiver from an NF Repository Function, NRF, node, addressing information to access a plurality of NF segments registered in the NRF node and, for each NF segment, an assigned Routing Indicator;

store, at a data memory, the addressing information for the plurality of NF segments and, for each NF segment, the assigned Routing Indicator; and determine the addressing information to access the NF segment assigned for the UE based on the Routing Indicator.

12. The first network node of claim 11, wherein in selecting the NF segment assigned for the UE based on the Routing Indicator, the first network node is further operable configured to:

discover, via the receiver from an NF Repository Function, NRF, node, addressing information to access an NF segment assigned for the UE based on the Routing Indicator; and store, at a data memory, the addressing information for the NF segment assigned for the UE and the assigned Routing Indicator.

13. The first network node of claim 11, wherein the second network node implements any one of: an Authentication Server Function, AUSF, a Unified Data Management, UDM, a Session Management Function, SMF, a Short Message Service Function, SMSF, and a further AMF.

14. The first network node of claim 11, wherein the NF segment assigned for the UE implements any one of: an Authentication Server Function, AUSF, instance, a Unified Data Management, UDM, instance and a Unified Data Repository, UDR, instance.

15. A second network node of a core network for accessing a Network Function, NF, segment as an NF consumer, the NF segment corresponding to an NF producer instance in charge of a set of user equipment, UE, for subscribers of the core network, the second network node configured to:

receive, via a receiver, an operation request with a Subscription Permanent Identifier, SUPI, and a Routing Indicator for a UE, the SUPI and the Routing Indicator provided from a first network node, which implements an Access and Mobility Management Function, AMF, to facilitate discovery by the second network node of an NF segment assigned for the UE;

select an NF segment assigned for the UE based on the Routing Indicator; and access, via a transmitter to the NF segment assigned for the UE, to perform a UE related procedure.

16. The second network node of claim 15, further configured to store, at a data memory, the SUPI and the Routing Indicator for the UE.

17. The second network node of claim 15, wherein in selecting the NF segment assigned for the UE based on the Routing Indicator, the second network node is further configured to:

discover, via the receiver from an NF Repository Function, NRF, node, addressing information to access a plurality of NF segments registered in the NRF node and, for each NF segment, an assigned Routing Indicator;

store, at a data memory, the addressing information for the plurality of NF segments and, for each NF segment, the assigned Routing Indicator; and determine the addressing information to access the NF segment assigned for the UE based on the Routing Indicator.

18. The second network node of claim 15, wherein in selecting the NF segment assigned for the UE based on the Routing Indicator, the second network node is further configured to:

discover, via the receiver from an NF Repository Function, NRF, node, addressing information to access an NF segment assigned for the UE based on the Routing Indicator; and store, at a data memory, the addressing information for the NF segment assigned for the UE and the assigned Routing Indicator.

19. The second network node of claim 15, wherein the second network node implements any one of: an Authentication Server Function, AUSF, a Unified Data Management, UDM, a Session Management Function, SMF, a Short Message Service Function, SMSF, and a further AMF.

20. The second network node of claim 15, wherein the NF segment assigned for the UE implements any one of: an Authentication Server Function, AUSF, instance, a Unified Data Management, UDM, instance and a Unified Data Repository, UDR, instance.

* * * * *